United States Patent

Lemkin

[11] Patent Number: 4,538,762
[45] Date of Patent: Sep. 3, 1985

[54] PATTERN CONTROLLED SPRINKLER APPARATUS

[75] Inventor: Jack L. Lemkin, Cincinnati, Ohio

[73] Assignee: The O. M. Scott & Sons Company, Marysville, Ohio

[21] Appl. No.: 486,008

[22] Filed: Apr. 18, 1983

[30] Foreign Application Priority Data

Apr. 18, 1982 [IL] Israel .................................. 65515

[51] Int. Cl.³ .............................................. B05B 3/08
[52] U.S. Cl. ................................... 239/232; 239/236; 239/DIG. 1
[58] Field of Search ................. 239/236, DIG. 1, 231, 239/232, 233, 264, 230

[56] References Cited

U.S. PATENT DOCUMENTS

| | | | |
|---|---|---|---|
| 2,586,517 | 2/1952 | Coles | 239/DIG. 1 |
| 2,619,383 | 11/1952 | Jepson | 239/231 |
| 2,654,635 | 10/1953 | Lazzarini | 239/236 X |
| 2,999,645 | 9/1961 | Kennedy | 239/231 X |
| 3,017,123 | 1/1962 | Rinkewich et al. | 239/233 X |
| 4,245,786 | 1/1981 | Abrahamsen et al. | 239/DIG. 1 X |

Primary Examiner—Andres Kashnikow
Assistant Examiner—Daniel R. Edelbrock
Attorney, Agent, or Firm—Harold J. Holt

[57] ABSTRACT

A rotary sprinkler of the impact type having a manually settable mechanism for both selecting and displaying an overall pattern configuration of sprinkler stream coverage. The manually settable mechanism comprises two concentric abutting surfaces, one being rotatable and the other being fixed relative to the sprinkler stem. The surfaces in combination indicate the pattern configuration. The rotatable surface includes a cam which engages a first or a second cam follower on a water stream deflector assembly to provide a first or a second patterned configuration of sprinkler stream coverage.

9 Claims, 9 Drawing Figures 4,538,762

PATTERN CONTROLLED SPRINKLER APPARATUS

FIELD OF THE INVENTION

The present invention relates to rotary sprinklers providing pattern control.

BACKGROUND OF THE INVENTION

There is described in a patent application entitled "Rotary Sprinkler Having Selectable Area Coverage" filed by Naan Mechanical Works in the Israel Patent Office on the same day as the filing of this application namely Apr. 18, 1982, a rotary sprinkler of the impact type providing dialable selection of square and circular patterns of different sizes. The sprinkler described and claimed in the aforesaid patent application of Naan Mechanical Works includes a base, a stem mounted on the base for rotation relative thereto, the stem having an inlet for receiving a pressurized water supply, a water discharge nozzle mounted on the stem and being rotatable together therewith relative to the base, water driven drive apparatus for rotating the stem relative to the base, selectably positionable deflector apparatus for engaging a stream of water emitted by the nozzle for determining the maximum radius of the stream and cam apparatus for operating the deflector apparatus in accordance with the azimuthal orientation of the nozzle, the deflector apparatus comprising a first element movably mounted onto the stem and defining a pivot location and a second element defining a water stream engaging portion and a cam following portion, pivotably mounted onto that pivot location, the cam apparatus comprising first cam apparatus operative to determine the orientation of the first element and the location of the pivot location and second cam apparatus engaged by the cam following portion for determining a desired sprinkling pattern as a function of the azimuthal orientation of the nozzle.

There is also described and claimed in the aforesaid patent application of Naan Mechanical Works a rotary sprinkler having a base, stem, nozzle, drive apparatus and deflector apparatus as described above and also including cam apparatus for operating the deflector apparatus and including manually settable cam apparatus for selecting an overall size and pattern of sprinkler stream coverage and second cam apparatus for determining the desired sprinkling pattern as a function of the azimuthal orientation of the nozzle.

Various configurations of cams and linkages are also described exemplarily in the aforesaid patent application of Naan Mechanical Works.

SUMMARY OF THE INVENTION

The present invention provides a manually settable cam design and linkage configuration for a rotary sprinkler of the impact type described in the aforesaid patent application. This particular cam design and linkage configuration enables a plurality of pattern sizes to be quickly and conveniently selected and displayed on a pattern size selection dial.

There is thus provided in accordance with an embodiment of the invention a rotary sprinkler comprising a base, a stem mounted on the base for rotation relative thereto, the stem having an inlet for receiving a pressurized water supply, a water discharge nozzle mounted on the stem and being rotatable together therewith relative to the base, water driven drive apparatus for rotating the stem relative to the base, selectably positionable deflector means for engaging a stream of water emitted by the nozzle for determining the maximum radius of the stream and manually settable cam means for both selecting and displaying an overall pattern size of sprinkler stream coverage comprising two concentric abutting surfaces, one of said surfaces being rotably coupled through a cam defining surface with the deflector means, the other of said surfaces being fixed relative to said stem, said two abutting surfaces carrying indicia which in combination indicate the pattern size. In one embodiment of the invention, the pattern size indicia are arranged over a relatively small angular segment of the surfaces, thus involving a relatively small angular movement between adjacent selectable positions.

Further in accordance with an embodiment of the present invention, the said one surface is formed with a pattern selection determining cam on the underside thereof which is modulated in a vertical plane to provide pattern size selection.

In accordance with an additional embodiment of the invention, the sprinkler contains a second cam means for selecting the pattern configuration of sprinkler stream coverage as a function of the azimuthal orientation of the nozzle, e.g. selecting a square vs. a round coverage pattern.

Additionally in accordance with an embodiment of the present invention, the deflector means comprises a first element slidably mounted on the stem and defining a pivot location and a second element defining a water stream engaging portion engageable with said manually settable pattern size cam means, said deflector means also comprising a cam following portion engaging said second cam means and defining a second pivot location, and a deflecting arm mounted at said second pivot location and connected to said second element via a lost motion mechanism.

Further in accordance with an embodiment of the invention, the cam following portion of the water stream engaging portion also engages the pattern selection defining cam at certain locations of the cam.

Further in accordance with an embodiment of the present invention the sprinkler of the present invention is provided with a base having a pair of side runners, a first connecting support joining the side runners in coplanar orientation therewith and a pair of inwardly facing side protrusions mounted on the pair of side runners for selectable and removable securing and attachment of a timer or other control means useful in connection with the sprinkler.

BRIEF DESCRIPTION OF THE DRAWINGS

The present invention will be more fully understood and appreciated from the following detailed description taken in conjunction with the drawings in which.

DETAILED DESCRIPTION OF A PREFERRED EMBODIMENT

Reference is now made to FIGS. 1-4 which illustrate a rotary sprinkler constructed and operative in accordance with an embodiment of the invention. As seen particularly in FIG. 3, the invention is particularly directed at a rotary sprinkler having a manually selectable dial providing a number of selectable positions, each representing a particular selected mode of operation, the selectable positions being arranged along less than about 120° of arc in the embodiment shown in FIG. 3.

Figure 3:
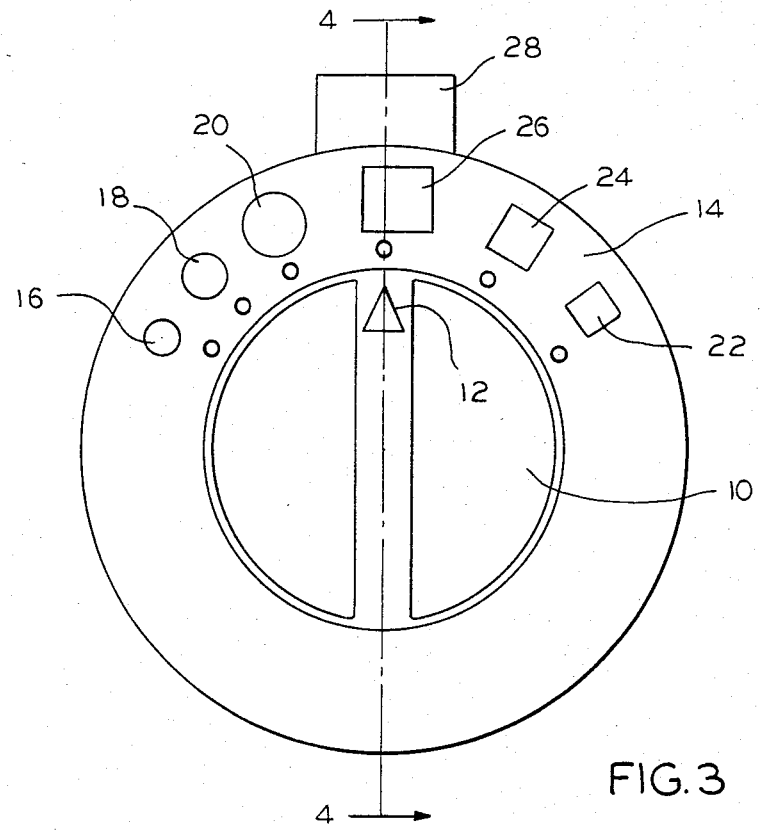
FIG. 3 is a top view illustration showing the pattern selection dial and display surface of the present invention.

In the illustrated embodiment, a central dial 10 has an arrow 12 defined thereon and is fixed with respect to the stem of the sprinkler. An annular housing surface 14 is rotatable with respect to central dial 10 and defines a manually manipulatable dial having defined thereon a number of selectable positions, each corresponding to a mode of sprinkler operation. The two concentric abutting surfaces of dial 10 and annular housing 14 are located on the same horizontal plane in this embodiment with the pattern size indicia appearing on their top edges. In addition, in this embodiment, the selectable modes of operation are three circular coverage areas of different sizes indicated by circles 16, 18 and 20 and three square coverage areas indicated by squares 22, 24 and 26 of different sizes. The outer extending portion 28 of a deflector which determines the patterns is also illustrated in FIG. 3.

The mechanism for providing the selectable modes of operation will now be described with reference to FIGS. 1 and 2, it being noted that a general description of this mechanism is provided and the mechanism claimed in the aforesaid co-pending Israel patent application. The mechanism defined herein represents a particular embodiment of the sprinkler described and claimed in the aforesaid application and is described herein for the sake of completeness of disclosure of the best mode.

Figure 1:
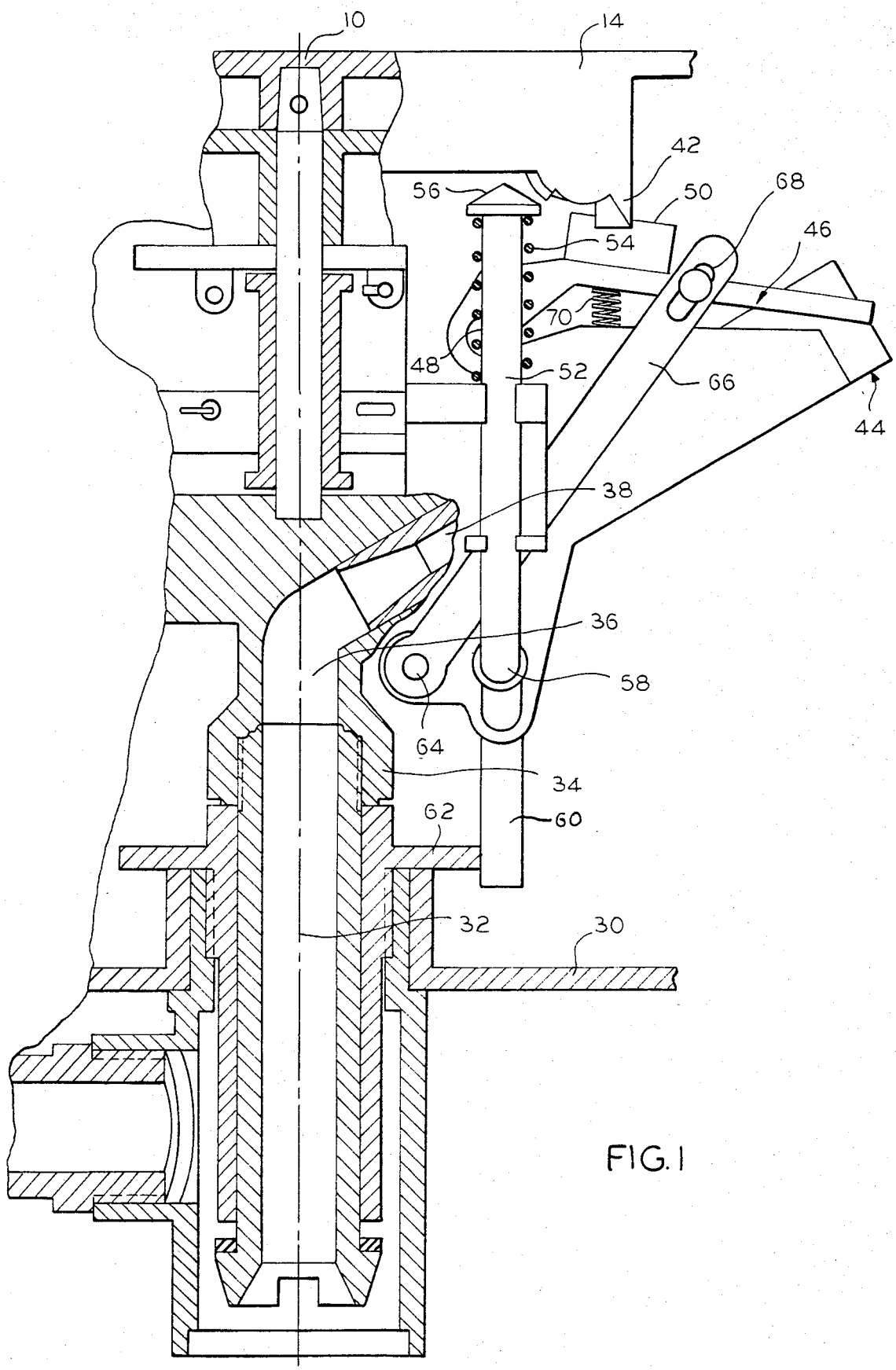
FIGS. 1 and 2 are illustrations partly in section of a rotary sprinkler constructed and operative in accordance with an embodiment of the present invention in first and second alternative operative orientations.
Figure 2:
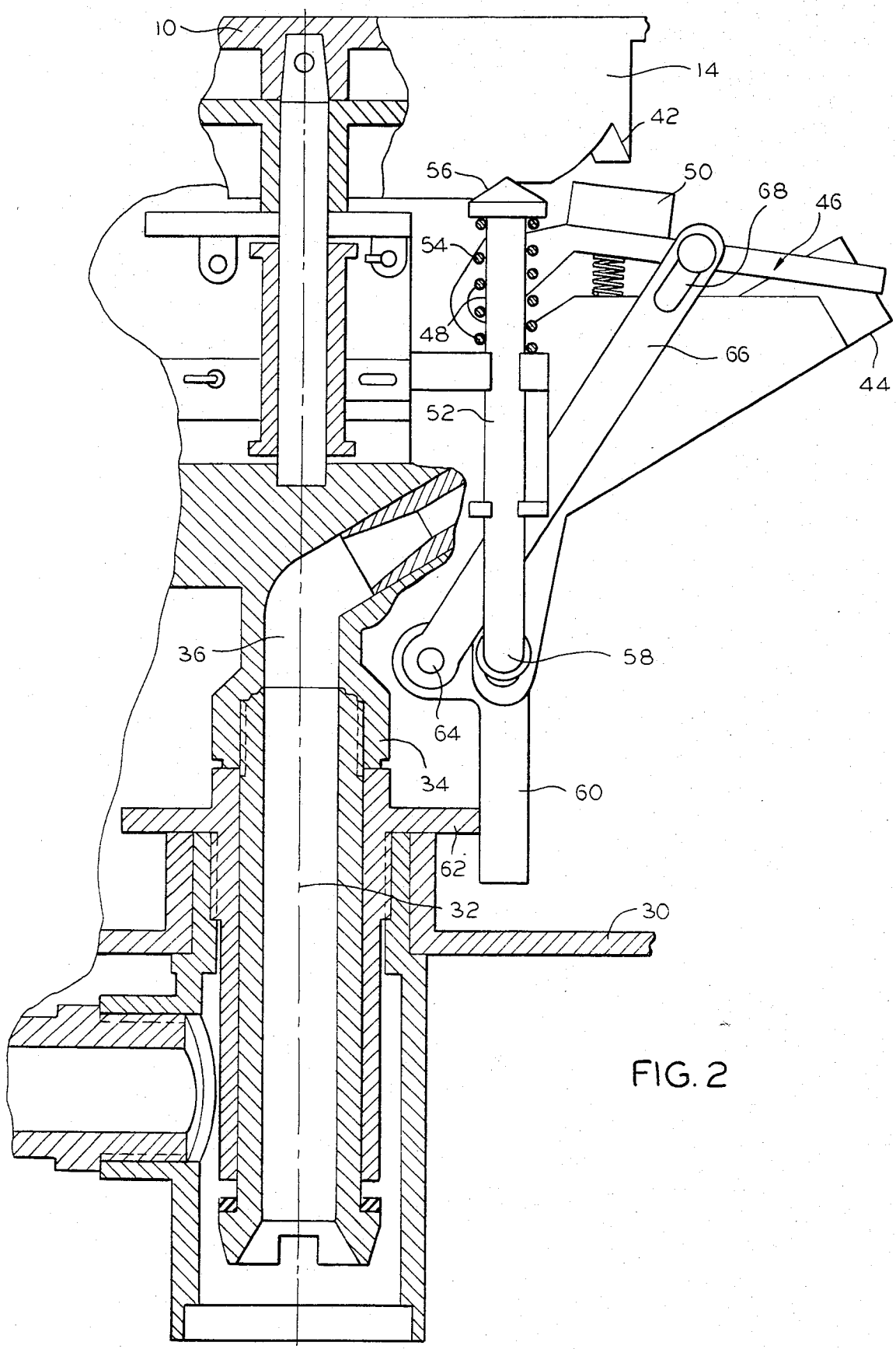

As seen in FIGS. 1 and 2, the sprinkler comprises a base 30 having defined therein an axis of sprinkler rotation 32. A stem 34 is rotatably mounted onto base 30 for rotation about axis 32. The stem 34 defines a water supply conduit 36 which terminates in a nozzle 38. Fixedly mounted onto the stem is a central dial 10 (FIG. 3) and rotatably mounted with respect to the central dial 10 and with respect to the stem 34 is an annular housing surface portion 14 which has formed on the top surface edge thereof the legends indicating the selectable pattern modes. Formed on a bottom facing edge of annular housing surface portion 14 is a vertically modulated cam 42 in predetermined corresponding relationship and registration with the legends indicating the selectable pattern modes. Thus, arrangement of the surface portion 14 in a predetermined pattern mode causes a predetermined portion of the cam 42 to engage cam following apparatus which will be described hereinbelow.

Rotatably mounted onto the stem is a deflector hammer 44 which is entirely conventional and need not be described herein. A pattern defining deflector 46 is pivotably mounted onto the stem at a pivot location 48. Deflector 46, whose outer portion 28 is shown in FIG. 3, is formed with a cam following edge portion 50 on the top surface thereof.

A cam following shaft 52 is slidably mounted with respect to stem 34 and is spring biased by a spring 54 towards engagement with cam 42. Shaft 52 terminates at its upper end in a point cam engaging surface 56 and at its lower end in a transverse arm 58 which slidably engages a slot fixedly defined with respect to the stem 34. Attached to transverse arm 58 is a pattern defining cam engaging finger 60 which engages a pattern defining cam 62 when disposed in a cam engaging orientation.

Pivotably mounted with respect to finger 60 about a pivot location 64 is a deflecting arm 66 having a slot 68 at its upper end which slot is engaged by a pin attached to deflector 46 and disposed about midway along the length of the deflector 46. A spring 70 biases the deflector 46 upwards with respect to the stem and towards engagement with the cam 42.

Figure 5:
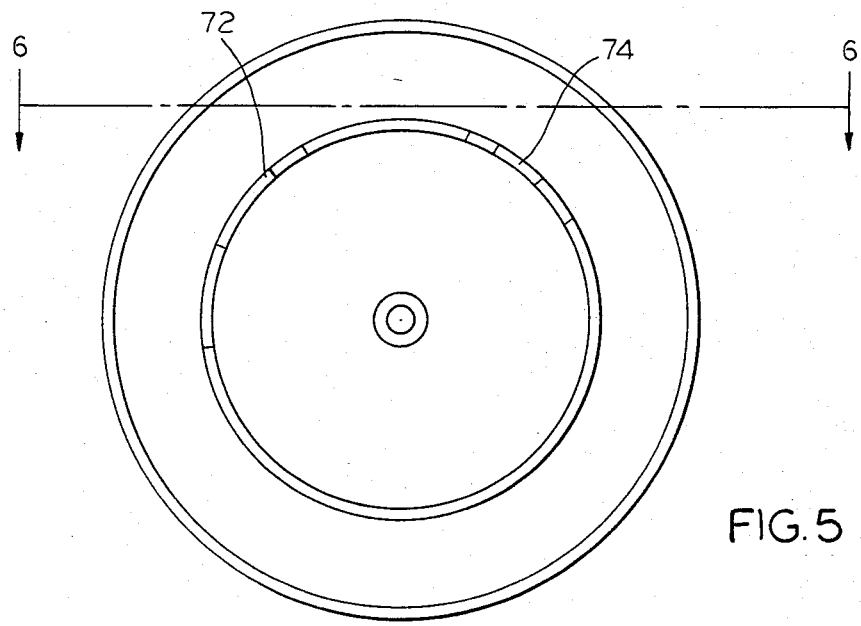
FIG. 5 is a bottom view illustration of the display means of FIG. 3.
Figure 6:
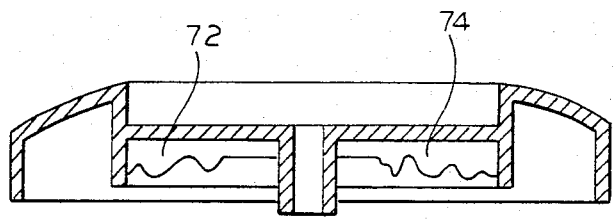
FIG. 6 is a side view sectional illustration along the lines 6—6 of FIG. 5 illustrating the modulation of the cam defined on the underside of the display means shown in FIG. 5.

The configuration of cam 42 is illustrated in FIGS. 5 and 6, it being noted that the illustration of FIG. 6 has a certain angular distortion since it is a side view of a curved object. Cam 42 may be understood to comprise two sections, a square pattern section 72 which is engaged only by cam following surface 56 and a circular pattern section 74 which is engaged only by cam following edge portion 50.

Figure 4:
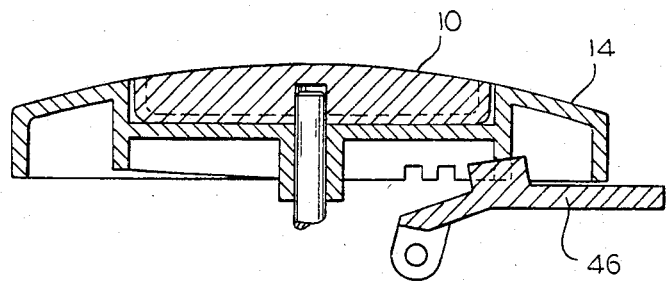
FIG. 4 is a sectional view of the display means along the lines 4—4 of FIG. 3.
Figure 7:
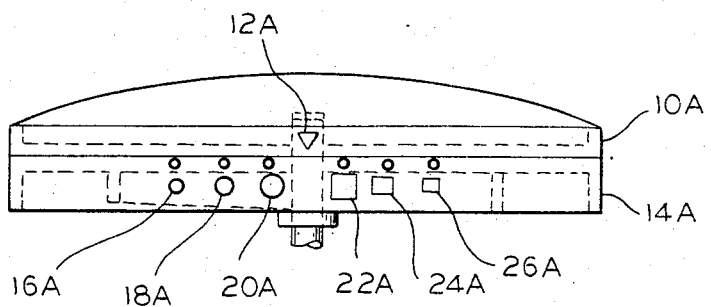
FIG. 7 is a side view of an alternative embodiment of the display means of FIG. 3.

An alternative embodiment of the display means shown in FIGS. 3 and 4 is shown in FIG. 7. In this embodiment dial 10A is located vertically above concentric abutting surface 14A. Dial 10A carries an arrow 12A while abutting surface 14A carries circles 16A, 18A and 20A and squares 22A, 24A and 26A for indicating circular and square patterns respectively.

The operation of the mechanism of FIGS. 1 and 2 will now be described. When a circular pattern is indicated, only the cam following edge portion 50 engages cam 42 at section 74. This orientation is shown in FIG. 1. It may be seen that the engagement of edge portion 50 determines the orientation of deflector 46 to the exclusion of any influence by the position or orientation of finger 60. The changes in position of finger 60 in this mode of operation are taken up by the lost motion mechanism embodied in slot 68. The size of the circular pattern produced by the sprinkler is determined by the vertical extent that edge portion 50 is depressed by cam 42 at section 74. Thus each indicated selectable circular pattern corresponds to a predetermined depth of vertical cam modulation.

When a square pattern is indicated only surface 56 engages the cam 42 at section 72 and the edge portion 50 does not engage the cam. Therefore the orientation of the deflector 46 is governed by deflecting arm 66 whose orientation is governed in turn by engagement of finger 60 with the pattern defining cam 62 to define a desired pattern. The overall size of the pattern is determined by the vertical depression of shaft 52 by cam 42 at section 72, the smaller the desired square, the greater the depression.

Figure 8:
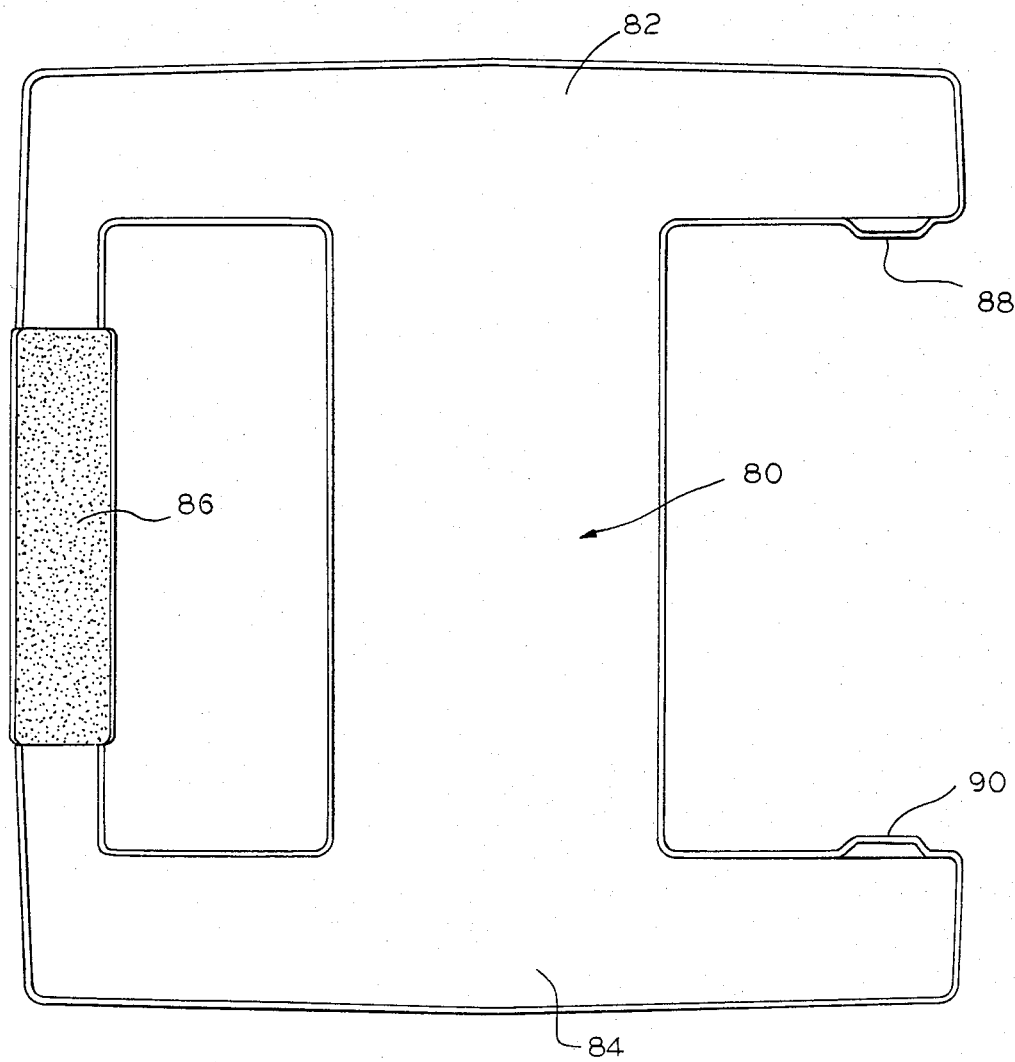
FIGS. 8 and 9 are respectively top and side views of the sprinkler base constructed and operative in accordance with an emodiment of the present invention.
Figure 9:
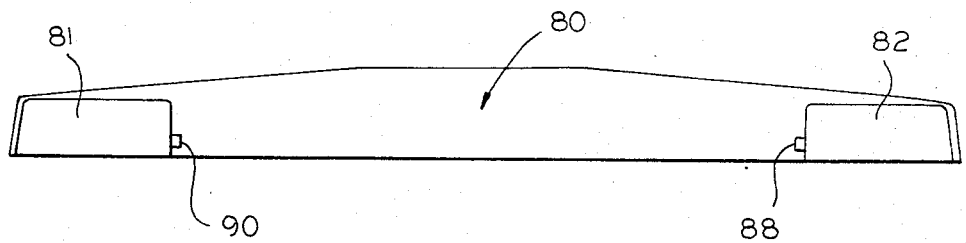

Reference is now made to FIGS. 8 and 9 which illustrate a base particularly suitable for the sprinkler of FIGS. 1-5. The base, indicated by reference numeral 80 is characterized in that it includes two side arms 82 and 84 joined by a single end arm 86. In place of a second end arm there are provided a pair of facing engagement protrusions 88 and 90 for removably securing a timer or other control mechanism for use with the sprinkler (not shown).

It will be apparent to persons skilled in the art that the present invention is not limited to what has been particularly shown and described hereinabove. Rather the scope of the present invention is defined only by the claims which follow.

I claim:

1. A rotary sprinkler comprising:
   a base;
   a stem mounted onto the base for rotation relative thereto, the stem having an inlet for receiving a pressurized water supply;
   a water discharge nozzle mounted on the stem and being rotatable together therewith relative to the base;
   water driven drive apparatus for rotating the stem relative to the base;
   selectably positionable deflector means for engaging a stream of water emitted by said nozzle for controlling the configuration sprinkler stream coverage;
   manually settable means for both selecting and displaying an overall pattern configuration of sprinkler stream coverage comprising two concentric abutting surfaces, one of said surfaces being rotatable relative to said stem, the other of said surfaces being fixed relative to said stem, said two abutting surfaces carrying indicia which in combination indicate the pattern configuration; and
   said rotatable surface including a cam means, said cam means being modulated in a vertical plane relative to said stem such that in a first mode of operation said cam means engages a first cam following means on said deflector means to provide a first patterned configuration of sprinkler stream coverage and in a second mode of operation said cam means disengages from said first cam following means and engages a second cam following means on said deflector means to provide a second patterned configuration of sprinkler stream coverage.

2. The rotary sprinkler of claim 1 in which the cam means is formed on the underside of said rotatable surface.

3. The rotary sprinkler of claim 1 in which said pattern size indicia are arranged along less than 120° of arc of said surfaces.

4. The rotary sprinkler of claim 1 in which the top edges of said two concentric abutting surfaces are located on the same horizontal plane, the one of said surfaces being annular and the other of said surfaces being a dial located centrally within said annular surface, the top edges of said surfaces containing pattern size indicia.

5. The rotary sprinkler of claim 4 in which said dial is fixed with respect to said stem and said annular surface is rotatably mounted with respect to the dial and with respect to the stem.

6. The rotary sprinkler of claim 1 containing a second cam means engageable when said first cam following means is in engagement with said cam means to enable said first pattern configuration of sprinkler stream coverage as a function of the azimuthal orientation of the nozzle.

7. The rotary sprinkler of claim 6 in which said deflector means comprises a first element slidably mounted on said stem and including said first cam following means engageable with said cam means, a second element defining a water stream engaging portion and including said second cam following means engageable with said cam means, said first element also including a cam following portion for engagement with said second cam means, said deflector means further including a deflecting arm pivotably mounted relative to said first element and connected to said second element via a lost motion means whereby changes in position of said cam following portion will not affect the position of said second element when said first cam following means is disengaged from said cam means.

8. The rotary sprinkler of claim 1 in which said two concentric abutting surfaces are located vertically one above the other, the sides of said surfaces containing pattern size indicia.

9. The sprinkler of claim 1 in which the base comprises a pair of side runners, a first connecting support joining the side runners in generally coplanar orientation therewith and a pair of inwardly facing side protrusions mounted on said pair of side runners for selectably and removable securing and attachment of a time or other control means useful in combination with the sprinkler.

* * * * *